(12) United States Patent  
Greschik et al.

(10) Patent No.: US 10,642,011 B2  
(45) Date of Patent: *May 5, 2020

(54) LIGHTWEIGHT, LOW-COST HELIOSTAT MIRROR FOR CONCENTRATING SOLAR POWER

(71) Applicant: L'Garde, Inc., Tustin, CA (US)

(72) Inventors: Gyula Greschik, Boulder, CO (US); Arthur L. Palisoc, Irvine, CA (US)

(73) Assignee: L'Garde, Inc., Tustin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/048,118

(22) Filed: Jul. 27, 2018

(65) Prior Publication Data

US 2019/0041618 A1    Feb. 7, 2019

Related U.S. Application Data

(63) Continuation of application No. 14/642,640, filed on Mar. 9, 2015, now Pat. No. 10,036,878.

(60) Provisional application No. 61/976,421, filed on Apr. 7, 2014, provisional application No. 62/088,167, filed on Dec. 5, 2014.

(51) Int. Cl.
| | | |
|---|---|---|
| G02B 19/00 | (2006.01) |
| G02B 5/09 | (2006.01) |
| G02B 7/183 | (2006.01) |
| F24S 23/70 | (2018.01) |
| F24S 23/77 | (2018.01) |
| F24S 25/00 | (2018.01) |
| F24S 25/65 | (2018.01) |
| G02B 5/08 | (2006.01) |
| F24S 80/00 | (2018.01) |

(52) U.S. Cl.
CPC .......... *G02B 19/0042* (2013.01); *F24S 23/77* (2018.05); *F24S 23/82* (2018.05); *F24S 25/00* (2018.05); *F24S 25/65* (2018.05); *G02B 5/0808* (2013.01); *G02B 5/09* (2013.01); *G02B 7/183* (2013.01); *G02B 19/0019* (2013.01); *F24S 2025/80* (2018.05); *F24S 2025/803* (2018.05); *F24S 2025/804* (2018.05); *F24S 2080/013* (2018.05); *Y02E 10/47* (2013.01)

(58) Field of Classification Search
CPC .. F24J 2/00; F24J 2/4609; F24J 2/4638; F24J 2/52; F24J 2/5264; F24J 2/5266; F24J 2/5269; F24J 2/54; F24J 2/407; F24J 2/06; F24J 2/08; F24J 2/10; F24J 2002/1061; F24J 2002/1066; F24J 2002/1071; F24J 2002/1076; F24J 2/16; F24J 2/523; F24J 2/38; F24J 2/4641; C02F 1/14; F03G 6/00; G02B 19/00; G02B 5/09; G02B 7/183; G02B 19/0042; G02B 19/0019; H01L 31/00; H01L 31/0525; H02S 40/44

See application file for complete search history.

(56) References Cited

U.S. PATENT DOCUMENTS

| | | | |
|---|---|---|---|
| 10,036,878 B2* | 7/2018 | Greschik | G02B 19/0042 |
| 2012/0313569 A1* | 12/2012 | Curran | H02J 7/355 |
| | | | 320/101 |
| 2013/0114155 A1* | 5/2013 | Eguro | G02B 5/10 |
| | | | 359/853 |

* cited by examiner

*Primary Examiner* — Jennifer D. Carruth  
(74) *Attorney, Agent, or Firm* — Buchalter; Kari L. Barnes

(57) ABSTRACT

Systems and methods are described herein that may be used to form a heliostat. Various reflective surfaces and support structures are described that permit lightweight construction of configurable heliostats.

14 Claims, 7 Drawing Sheets

LIGHTWEIGHT, LOW-COST HELIOSTAT MIRROR FOR CONCENTRATING SOLAR POWER

PRIORITY

This application claims priority to U.S. Application No. 61/976,421, filed Apr. 7, 2014, titled "Lightweight, Low-Cost Heliostat Mirror for Concentrating Solar Power;" and U.S. Application No. 62/088,167, filed Dec. 5, 2014, titled "Lightweight, Low-Cost Heliostat Mirror for Concentrating Solar Power," each of which are incorporated by reference in its entirety into this application.

BACKGROUND

One approach to solar electric power generation is to use one or more heliostats to heat and focus reflected solar radiation onto a container of high-specific-heat material. A heliostat is basically a flat plate with a highly reflective surface to efficiently reflect most of the solar radiation incident upon it onto the target container (the "receiver"). To accomplish this, the heliostat must be capable of tracking the sun across the sky and pointing the reflective surface in the appropriate direction to maintain the sun's reflected radiation on the container. In its most basic form, the heliostat is a simple planar support structure, coated with a highly-reflective optical material and mounted on a tracking/pointing pedestal. The desirable qualities of a state-of-the-art heliostat are lightweight, low-cost, structurally rigid, environmentally durable, with a highly reflective surface. In improved designs, a very slight curvature in the heliostat mirror is introduced to enhance the focusing quality.

SUMMARY

A new type of heliostat mirror and support structure are provided herein that make use of a novel design and material combinations.

An exemplary heliostat according to embodiments described herein may include a light weight support with one or both opposing surfaces coupled to a reflective material. The support, one or both opposing surfaces, and/or the reflective material may be flat or contoured. The light weight support may be, for example, a foam base. The reflective surface may be, for example, a metal sheet, mirrored film, or combinations thereof.

An exemplary heliostat according to embodiments described herein may include a support structure in which two or more sections are designed to be identical or mirror image duplicates. The exemplary heliostat may include attachable centerpieces between two or more of the identical or mirror image duplicate sections to control a desired shape of the heliostat. Therefore, the support structure may permit a configurable arrangement including a selectable curvature of the segments by interposing different centerpieces.

An exemplary heliostat according to embodiments described herein may include a support structure in which a first and second support structures are used to support a plurality of panels. The first support structure may include one or more components such as the wing and centerpiece configuration. The first support structure, second support structure, and combinations thereof may comprise interchangeable components such that the design of the heliostat may be configured by using selectable components. For example, curved or straight second support structures may be interchangeable, to impose a desired curvature to the heliostat panels.

DRAWINGS

FIG. 3A is a top perspective view, while FIG. 3B is a side cross-sectional view.

FIGS. 4A and 5A illustrate exemplary top elevation views of a heliostat according to embodiments described herein, while

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Although embodiments of the invention may be described and illustrated herein in terms of a heliostat comprising panels and support structures, it should be understood that embodiments of this invention are not so limited. Any combination of features described herein may be used singularly or in any combination to create any structure. Components or features from different embodiments therefore, can be duplicated, removed, integrated, separated, or combined with any other feature to achieve any combination of benefits described herein.

Figure 1:
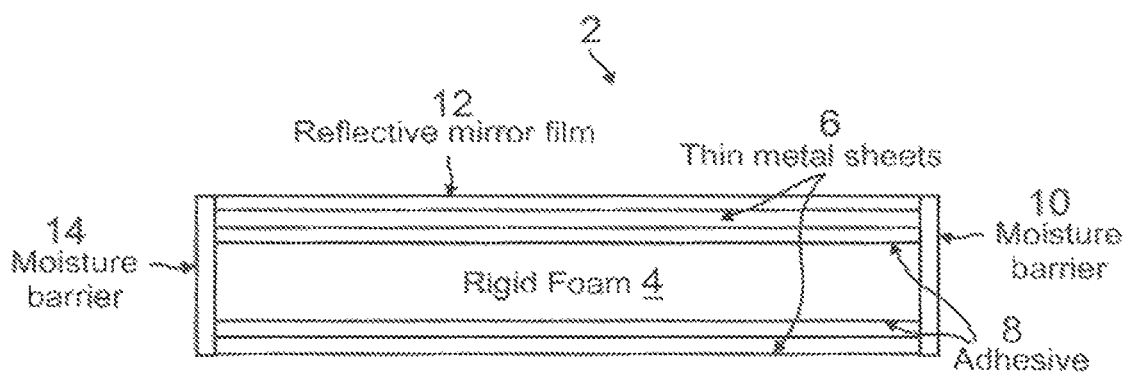
FIG. 1 illustrates a cross section of an exemplary heliostat panel as described herein.

FIG. 1 illustrates an exemplary cross-section of a heliostat mirror according to embodiments described herein. In an exemplary embodiment, the design for a solar concentrating heliostat may include a lightweight base 4 with one or both opposing surfaces coupled to metal sheets 6. As shown, a rigid foam is used as the lightweight base 4 with both opposing surfaces coupled to metal sheets 6. The metal sheets 6 may be coupled to base layer by any method, including, for example, chemical and/or mechanical methods of an adhesive 8, bonding, bolting, mating surfaces, screwing, etc. The base 4, opposing surfaces, metal surfaces 6, or any combination thereof may be flat or contoured. The metal sheet 6 may be highly polished to provide the reflective surface or coupled to a mirror film 12. The mirror film may include one or more layers of material, such as a base or backing layer and an outer metallic or reflective layer. A moisture barrier 14 may also be applied and enclose the heliostat or may be applied just along the edges or lateral sides of the opposing surfaces to seal the terminal ends and space between the respective layers. Any combination of the described features and embodiments may be used, such that components may be added, duplicated, subtracted, and recombined.

The exemplary lightweight base 4 may be used to provide the support structure for the heliostat and/or the shape of the heliostat. In an exemplary embodiment, the lightweight base 4 comprises a rigid foam. Exemplary rigid foams may include rigid expanded polystyrene (EPS), rigid polyurethane foam, epoxy foam, and carbon-reinforced foam.

Adhesives 8 may be used to bond the metal sheets to the foam support structure. In an exemplary embodiment, the adhesive is impervious to the weather and performs over a large temperature range. Examples of exemplary adhesives may include epoxy, silicone, urethane, polystyrene and polyester based adhesives in both liquid heat activated, hot melt, and spray on formats.

Thin metal sheets 6 may fully or partially cover one or more surfaces of the lightweight base 4. The thin metal sheets 6 can be, for example, stainless steel, aluminum, or titanium. The thin metal sheet may include a highly reflective or polished surface or may include a film to create the mirror surface. The thin reflective film may be eliminated if the top metal sheet used is a mirror-finish surface like mirror or super-mirror finish aluminum, mirror or super-mirror finish stainless steel, and mirror or super-mirror finish titanium.

If a thin reflective mirror film 12 is used, it may be made of one or more layers. An exemplary reflective mirror film 12 may be made of a thin polymeric material coated on the outer surface with a thin layer of reflective material, such as a metal. The reflective mirror film backing is typically comprised of materials such as thin polyimide, polyester (PET), polypropylene (OPP), polyethylene (PE), polyvinyl (PVC), nylon (BON), and polycarbonate (PC) film. In order to make the thin film reflective, a thin layer of silver or aluminum coating may be deposited on one surface. Exemplary embodiments described herein incorporate a mirror film. Film is understood to include any thin structure including, but not limited to, membrane, sheet, covering, coating, and combinations thereof.

For added protection against the environment, a moisture barrier 14, such as a moisture barrier rubber paint, may be applied all around the edges. For example, a moisture barrier 14 my enclose or cover the terminal ends of the respective layers of the lightweight base 4, metal sheets 6, and reflective mirror 12 to prevent separation of the layers. The moisture barrier 14 may also fully enclose the heliostat structure and contact the exterior surfaces of the reflective mirror film 12, the opposing thin metal sheet 6 or back side of the base 4 if a second metal sheet is not included, as well as the terminal ends of the respective layers, or any combination thereof. Other materials that can comprise an effective moisture barrier may include polyurethanes, acrylics, ethylene acrylic, nitrile, styrene butadiene, silicones, neoprenes, and epoxy.

An exemplary configuration is illustrated in FIG. 1. The solar concentrating heliostat 2 includes a lightweight rigid foam 4 backing with thin metal sheets 6 coupled, such as by bonding, on both surfaces. On one of the metal surfaces 6 is coupled, such as by bonding, to a very highly reflective and lightweight mirror film 12. The mirror film is made of a thin polymeric material coated on the outer surface with a thin layer of silver or aluminum on top of which is deposited a protective layer against oxygen and ultraviolet light. An exemplary embodiment uses EPDM™ rubber paint, stainless steel metal sheets, a rigid foam of expanded polystyrene (EPS), the adhesive polystyrene foam insulation adhesive and a mirror film constructed from silver-coated polyimide thin film.

Figure 2:
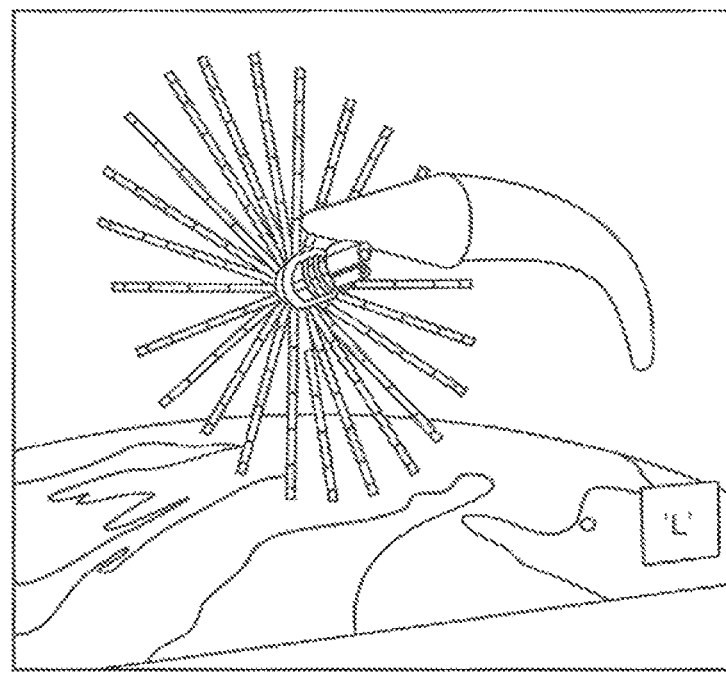
FIG. 2 illustrates an exemplary heliostat according to embodiments described herein.

Embodiments described herein incorporate very low-cost, lightweight materials while simultaneously maintaining an extremely accurate surface quality. Our analytical models indicated that rms slope errors on the order of 0.15 milli-radians were achievable with this design. Consequently, two 1-meter by 1-meter in area by 4 inch thick prototype concentrators have been built and measured for surface quality. FIG. 2 illustrates an exemplary one meter by one meter heliostat sub-facet prototype built according to embodiments described herein. This prototype heliostat submirror facet was measured using precise photogrammetry to have an rms slope error of 0.15 milli-radians.

Embodiments of the present disclosure also include proprietary methods for manufacturing and assembling the heliostat. Exemplary features of our production method include the use of inch-by-inch attachment, such as by bonding, of the mirror film to the stainless steel sheet using Teflon-coated rollers to apply pressure on the mirror film for stronger initial adhesion, and vacuum-bagging to assure excellent adhesion and prevention and elimination of bubbling. The fabrication may be automated using a roll-to-roll method wherein the thin metal sheets 6 are dispensed from a roller and applied onto either surface of the lightweight base 4 using a third roller. Adhesive application may also be automated by the use of jet nozzles. As the lightweight base 4 with the thin metal sheets 6 already bonded moves on a conveyor belt to the next section of the assembly line, the mirror film 12 may be applied to one of the metal sheets 6. This step is not necessary if one of the two metal sheets 6 used is already a reflective mirror.

The novel heliostat design described above may include several innovative support structures for the reflective panel that can reduce system cost and weight over conventionally-used structures.

Figure 3A:
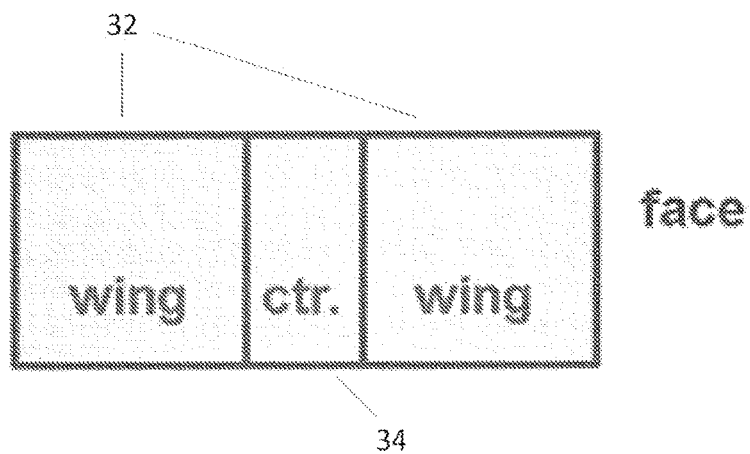
FIGS. 3A and 3B illustrates an exemplary support structure comprising three partitioned sections.
Figure 3B:
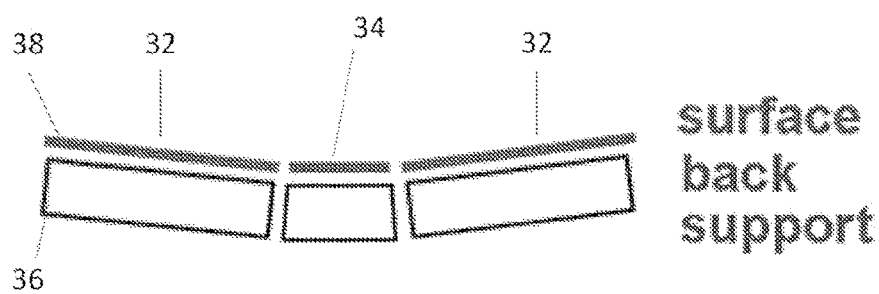

FIGS. 3A and 3B illustrates an exemplary support structure comprising three distinct parts joined to form a unit. FIG. 3A is a top perspective view, while FIG. 3B is a side cross-sectional view in which the back support 36 and surface structure 38 are exaggerated and separated for illustration only. A support structure with three distinct parts may include, for example, two wing sections 32 and a central section 34. As shown, two mirror symmetric identical wings and a centerpiece are provided on which the wings are mounted. The centerpiece, in turn, is mounted on an appropriate external structure (not shown), such as a pedestal or column. The wings and centerpiece may be coupled directly or indirectly. For example, and external frame may be used to wedge or support parts together, or the parts may be bonded, adhered, jointed, hinged, mating surfaces, or otherwise attached.

The wings and centerpiece can be constructed from different materials, such as, for example, galvanized steel or aluminum.

The wings may be straight or (slightly) curved. Curvature provides more accurate focusing of the sun's rays onto the target vessel. The curvature may be, for example, circular or parabolic.

Figure 4A:
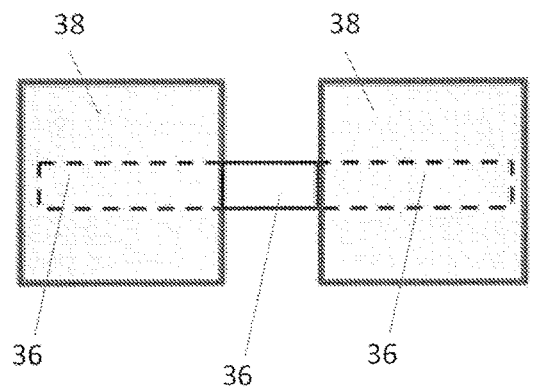
Figure 4B:
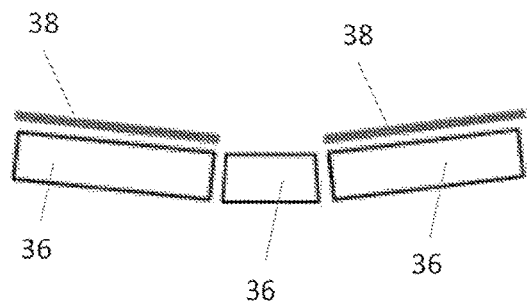
FIGS. 4B and 5B illustrate side elevation views of the exemplary embodiments of FIGS. 4A and 5A, respectively.
Figure 5A:
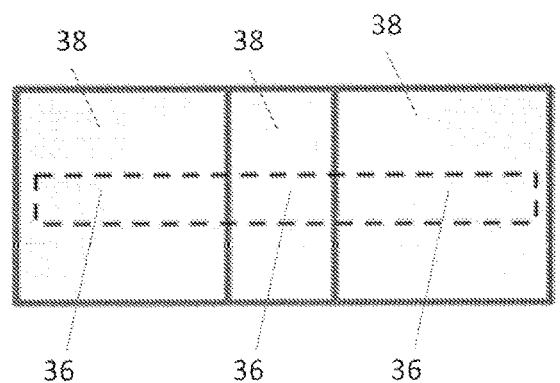
Figure 5B:
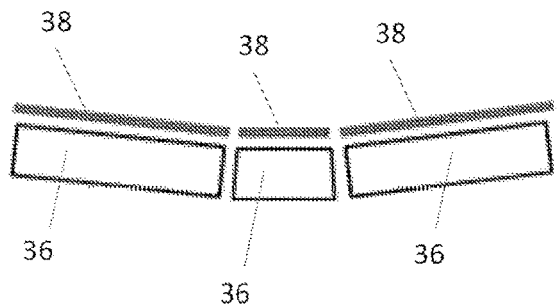

Elements of the precision reflective surface may be mounted over the wings alone or over the wings as well as over the centerpiece. FIGS. 4A and 4B illustrate an exemplary configuration in which the reflective surfaces are mounted over the wings alone. The centerpiece section of the support structure is therefore exposed along the top surface. FIGS. 5A and 5B illustrate an exemplary configuration in which the reflective surfaces are mounted over the wings and center piece together. This configuration allows the formation of two separate surfaces (over the wings) of a single continuous surface of the entire structure. FIGS. 4A and 5A illustrate exemplary top elevation views of exemplary embodiments of a heliostat, while FIGS. 4B and 5B illustrate side elevation views of exemplary embodiments of the heliostats of FIGS. 4A and 5A, respectively.

Figure 6:
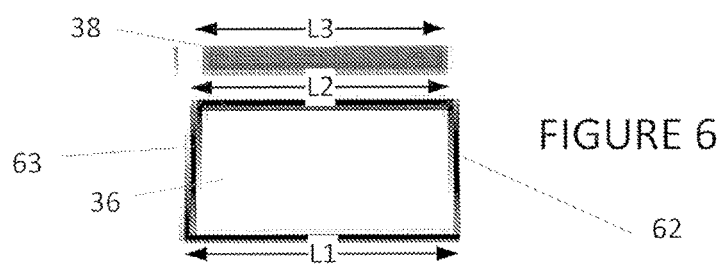
FIG. 6 illustrates an exemplary centerpiece including a precision surface and support structure.

In an exemplary embodiment, a slight curvature of the supported surface in the wing-wing direction is approximated by the centerpiece's shape which, by its geometry, orients the wings in a slightly convergent manner. For example, as illustrated by the side elevation views of FIGS. 4B and 5B, the profile of the centerpiece support structure may be tapered such that a top length of the centerpiece is less than a bottom length of the centerpiece. FIG. 6 illustrates an exemplary centerpiece including a precision surface 38 and support structure 36. As shown, the bottom surface of the support structure has a wing-wing length of L1, while a top surface of the support structure toward or adjacent the reflective surface has a length L2. As shown, L1 is greater than L2. The exterior edges 62, 63 of the centerpiece abut the support structure of the wings and are configured to orient the wings at a desired angle relative to the centerpiece section. The support structures of the wings may be generally rectangular in wing-wing cross-section or may themselves be slightly tapered. The surface structure 38 may comprise the reflective surface/precision surface. The surface structure 38 may have a wing-wing length of L3. The surface structure length L3 may be equal to or less than the top surface length L2 of the support structure adjacent the surface structure. The length L3 may be less than L2 for tapered profiles to prevent the surface structures from interfering in the angled configurations.

By controlling wing-wing curvature by the centerpiece shape alone, the fabrication of a high number of structural units (each consisting of the precision surface and its support) with different wing-wing curvatures is made economical. Specifically, the wing sections may be uniformly made and a wing-wing curvature can be achieved by simply exchanging different centerpieces of greater or less tapering profiles. The shape of the centerpiece is determined by the distance of the heliostat structure from the target vessel, with less curvature required as the distance between heliostat and target increases. A lesser wing-wing curvature can be achieved with less taper, or a more rectangular shaped support structure.

For example, a middle section of a tri-sectional configuration, is interchangeable in the sense that there may be typically several such alternative mid-sections pre-fabricated, and on any of these the same wings can be mounted on the two sides. Due to the slight differences of the geometries of the center elements, the pair of wings (and the center element) end up constituting a somewhat concave mirror, the concavity of which depends on the central element used. The need for mirror concavity is a function of location in the heliostat field: mirrors nearer the receiver have to be more concave than those farther away. Accordingly, center pieces of certain shapes will end up being used in certain continuous areas/regions within the heliostat field, making the mirrors there have identical shapes—but somewhat different shapes from mirrors in other areas of the heliostat field.

So, on the one hand, the primary support includes the wing, center, wing as illustrated, but, because the center in this triplet is not exactly identical across the heliostat field, the illustrated wing, center, wing structure still does not require exact geometric uniformity for all heliostat units.

The construction concept of different center pieces used across the field aims at eliminating the need for geometric tuning by nuts, screws, and other devices, otherwise necessary if different heliostat shapes are needed. By using a set of slightly different prefabricated center pieces instead, nothing needs to be adjusted on the construction site. Instead, simply, the right type of centerpiece has to be used. This is faster and simpler if well managed.

Figure 7:
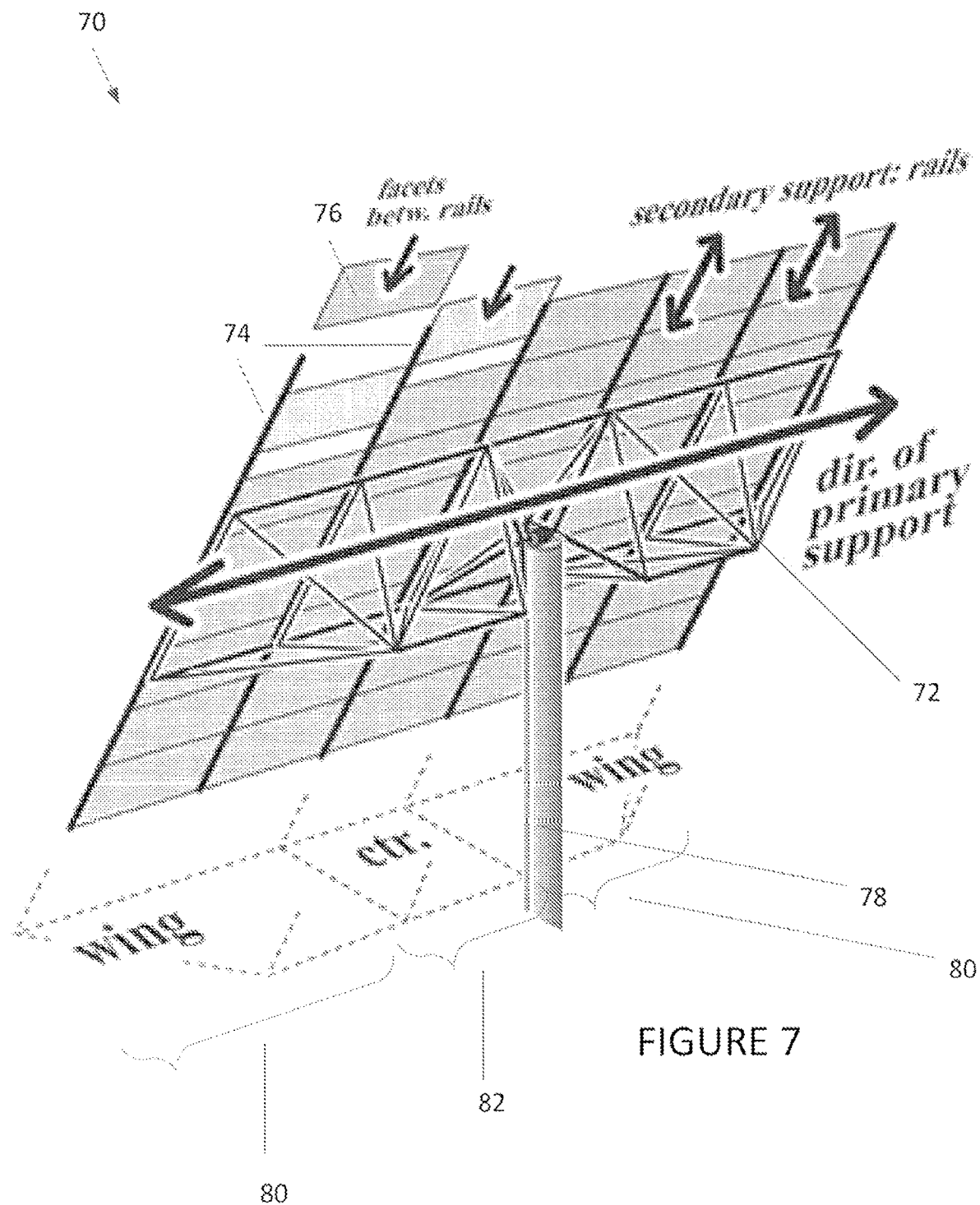
FIG. 7 illustrates an exemplary support structure embodiment for use with a plurality of precision surfaces to form a heliostat.

FIG. 7 illustrates an exemplary support structure embodiment for use with a plurality of precision surfaces to form a larger heliostat. In an exemplary embodiment, precision surfaces may include their own support structure such as the partitioned support structures described above with respect to FIGS. 4A and 4B, FIGS. 5A and 5B, or a combination thereof, or may be individual structures as described with respect to FIG. 1. Each surface supported by the proposed structure is constituted by a multitude of individual panels which are mounted by an appropriate means on a larger support structure. In order to facilitate the mounting of the individual panels on their support, the larger support comprises at least one primary support aligned in the wing-wing direction (consisting of the two wings and the centerpiece) and secondary support in the perpendicular direction from the wing-wing direction.

FIG. 7 illustrates an exemplary support layout 70 and mounting of individual panels 76 according to exemplary embodiments. The support layout 70 may include a primary support 72 in a wing-wing or first direction. A second support 74 may be included in a second direction generally perpendicular to the first direction. The second support system 74 may include a plurality of rails such that individual panels 76 are retained between two adjacent rails 74. The rails may be configured or spaced such that the same or different panel configurations may be positioned anywhere in the rail structure. The primary support 72 may be coupled to a base 78 to orient the heliostat in a desired direction toward the sun.

The support layout 70 may be configured to take advantage of the wing-wing curvature control through interchangeable, unique centerpieces and common, identical wings to permit low cost production of adjustable or dynamic designs. The primary support 72, for example may include two wings 80 of mirror symmetry and a centerpiece 82. The wings and center piece may be coupled together to form a unitary primary support 72. The center piece support can be configured to angle the panels of the wings relative to the face or panels of the centerpiece. As shown, the downward projection of the centerpiece and wings is shown in dotted lines below the heliostat 70. The cross sectional shape of the illustrated centerpiece is square or rectangular, thus aligning the wings parallel or flat relative to the centerpiece. The centerpiece cross-section may be tapered as described above to impose an angle to the wings relative to the centerpiece.

Figure 8:
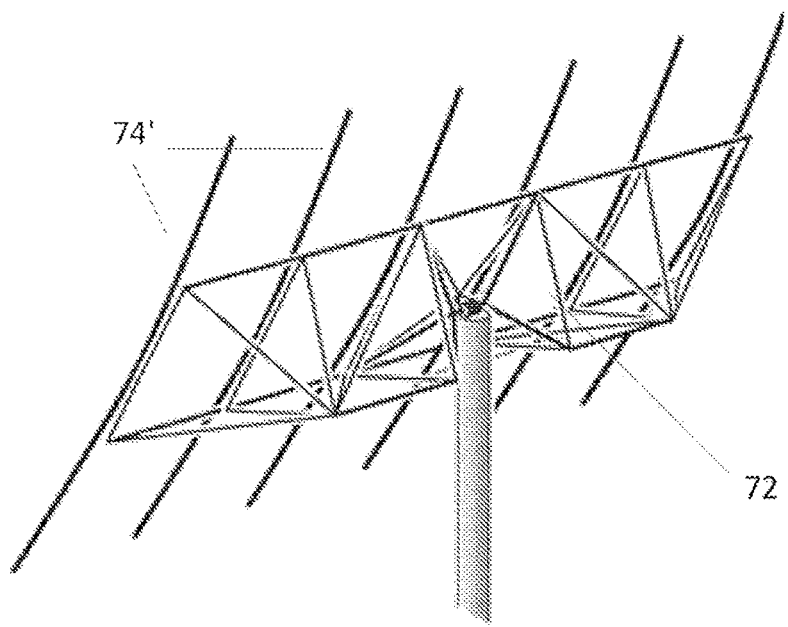
FIG. 8 illustrates an exemplary curvature imposed on an exemplary support structure.

The secondary support elements 74, 74' may include rails of prismatic cross section which may be straight 74 or may be (slightly) curved 74' as indicated in FIG. 8 to give the supported surface a secondary curvature in the rail direction (perpendicular to the curvature in the wing-wing direction, controlled by the centerpiece). FIG. 8 illustrates an exemplary slight curvature in the indicated second direction that is achieved with curved rails. The curvature shown in the figure is exaggerated for illustration purposes. The rails may be configured to accept planar or substantially planar panels while still imposing an angle between adjacent panels from the curvature of the rails 74'.

Figure 9:
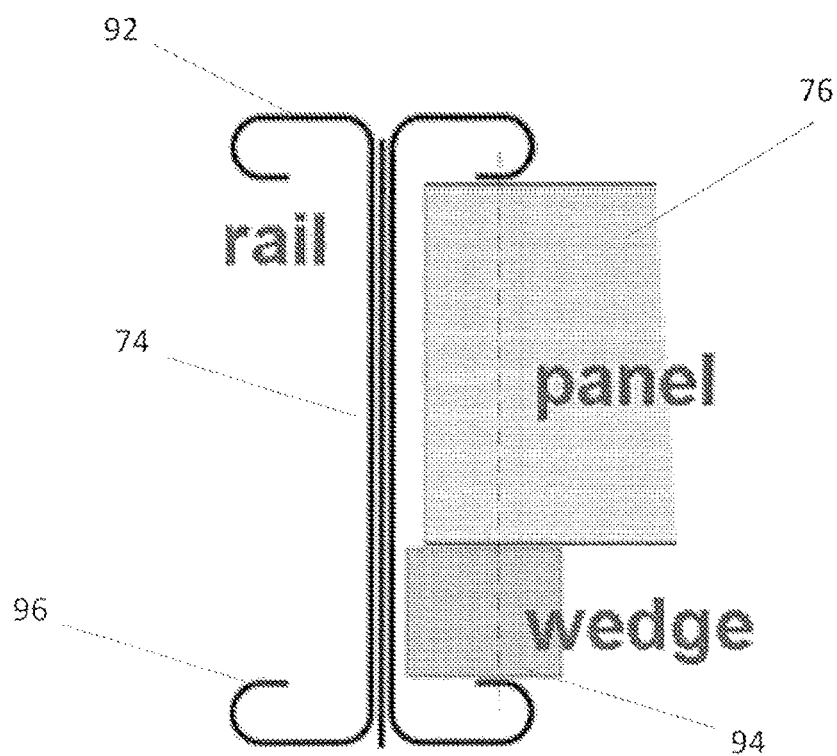
FIG. 9 illustrates an exemplary cross section of an exemplary support structure section to retain a panel in place.

FIG. 9 illustrates an exemplary cross section of a rail 74, 74' configured to retain a panel 76 in place. The rail cross sections have flanges 92 such that the panels 76 which constitute the surface itself can be placed (slid) between adjacent pairs of the parallel rails on each end between the rail flanges that prevent panel removal in all directions except sliding along the rails. As shown, a rail may include a first flange and second flange at opposing ends of the rail. When positioned in the support structure 70, the flanges extend from the rail in a direction of the primary support, indicated in FIG. 7, or parallel to the face of the heliostat or panels. The flanges may be positioned at a front and rear side of the rail. The bottom and/or top of the rail may also include a stopper such that a panel may be slid along the rail until encountering the stopper. In an exemplary embodiment, the rail bottom terminal end comprises a stopper such that the first panel rests against the stopper. The next panel then rests on the first panel, and the panels are stacked on top of each other and held in place in the forward and rearward direction by the flanges of the rails. The motion of the panels, once slid between the flanges of adjacent rail pairs, may also be arrested at any convenient position by wedging them between the rail flanges. This is shown in FIG. 9. Therefore, the separation of interior facing surfaces of opposing flanges on a rail may have a first separation distance greater than the thickness of a panel positioned within the rail. A wedge 94 or secondary material may be positioned between the panel and one of the flanges such that the panel is held stationary relative to the rail 74 by frictional engagement.

The cross section shape described in the previous paragraph may be achieved with standard I-beams, by combining other standard structural profiles such as a pair of C channels back-to-back, or by a unique design.

The rails may also be mounted on the primary support by a rapid lock mechanism. The rapid lock mechanism between rails and primary support may include protrusions on one component and slots on the other where the protrusions fit, and holes across that are aligned when the protrusions are inserted. Fasteners (bolts, rivets, wedges, pegs, etc.) can be driven through these holes to firmly attach the secondary rails 74, 74' to the primary support 72. The type of fastener to use depends on specific needs, e.g., on the need to rapid release or the lack thereof, or the need for precision.

Figure 10A:
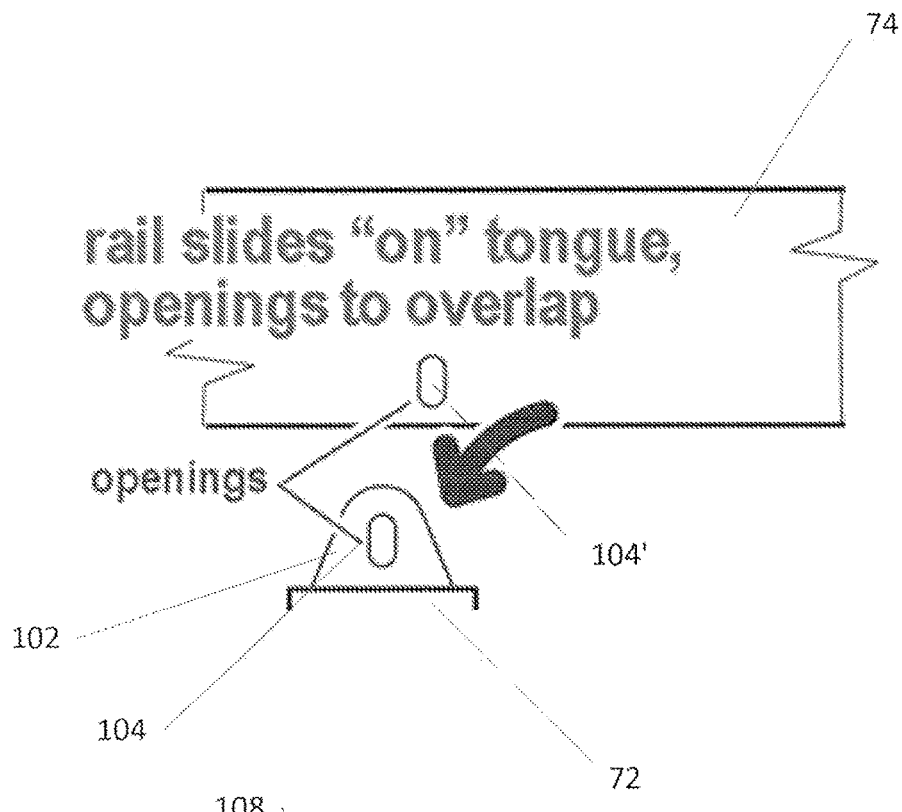
FIGS. 10A and 10B illustrate exemplary cut away features of an exemplary support structure for coupling portions of the support structure together.
Figure 10B:
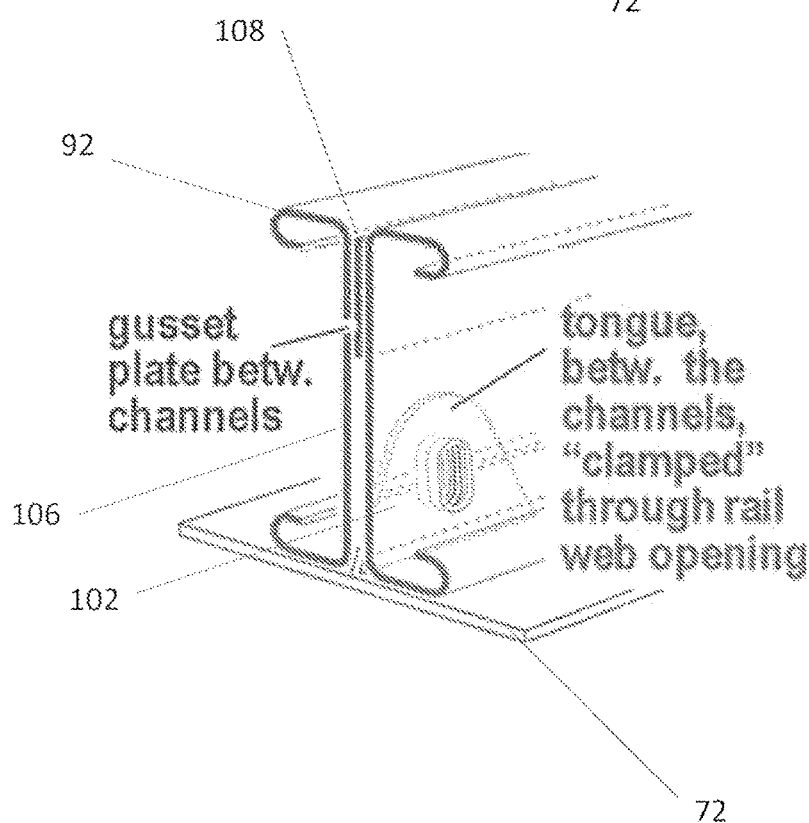

FIGS. 10A and 10B illustrate an exemplary connection configuration between the rails 74, 74' and the primary support 72. FIG. 10A illustrates an exemplary rail sliding on tongue openings, while FIG. 10B illustrates the tongue between channels clamped through web openings. The primary support 72 therefore may include a generally planar surface with a protrusion or tongue 102 extending from the face thereof. The protrusion may be generally planar and extend in a direction parallel to the direction of the rails, or perpendicular to the wing-wing direction, or perpendicular the direction of the primary support. The protrusion may include a hole 104 that corresponds to a similar hole 104' on the rail 74. The rail 74 may include two generally planar, parallel surfaces 106 coupled by a gusset plate 108. Each generally planar, parallel surface 106 may include a flange 92 at opposing ends extending generally perpendicular to the planar surface. The flange 92 may include a second projection or curvature such that an end of the flange extends further over the planar surface than a portion of the flange near the planar surface. In other words, a thickness of the flange near the planar surface is less than a thickness of the flange away from the surface near the terminal end of the flange. The flange therefore defines a channel for a panel to slide into. The tongue 102 of the primary support 72 fits into a space defined by the gusset plate 108. When the holes 104, 104', align, the rail may be anchored to the primary support.

Figure 11:
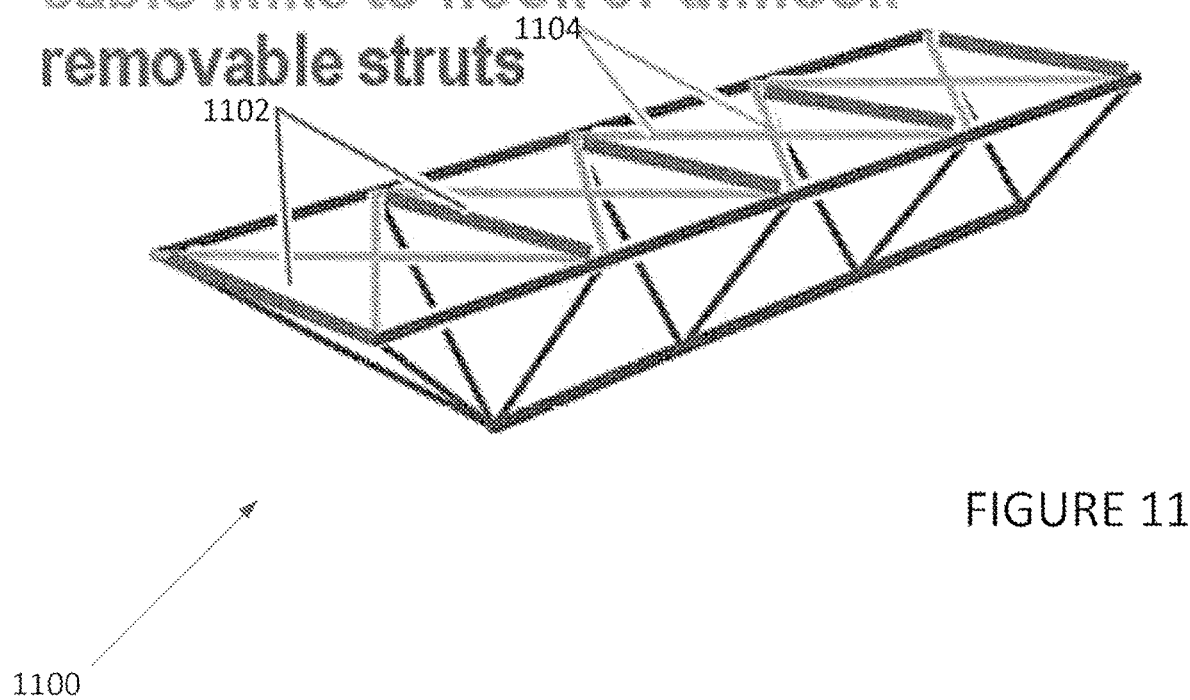
FIG. 11 illustrates an exemplary prismatic wing construction including removable battens and diagonals for collapsible storage.

The wings 1100 of the primary support 72 may be trusses of triangular cross section. The lateral struts (battens 1102 and diagonals 1104) on one face of the truss wings may be removable to permit nested stowage and shipping. FIG. 11 illustrates an exemplary prismatic wing construction including removable battens and diagonals. These removable struts may also be a combination of rigid struts and cable links, which can be easily and rapidly engaged at their final locations and robustly held there by pretensioning.

The precision surfaces described herein may be used with any support structures, such as any combination of support structures described herein or conventional support structures. In an exemplary embodiment, the support structure 36 of FIGS. 3-6 may be the support structure of the reflective surface, such as described with respect to FIG. 1, 4 or 6, or may be a secondary support structure in addition to the structures of FIG. 1. In an exemplary embodiment, the exemplary support structures may be used in conjunction such that a first support structure for the reflective surface may be used in accordance with FIG. 1 that is mounted or shaped in a partitioned configuration of FIG. 3, which is then incorporated into a larger structure according to FIG. 7. The support structures of FIGS. 3-7 may be used with any reflective or precision surface and not just those of FIG. 1.

Embodiments described herein may be used to dynamically configure a heliostat. The configuration of the heliostat may be configured such as to impose a desired curvature in one or more directions. As used herein, "curvature" is not limited to a continuous curvature, such as parabolic or elliptic smooth curves or surfaces. Instead, as used herein "curvature" includes a step-wise or piecewise curvature defined by adjacent planar or linear segments angled with respect to each other to form a perceived curvature along an entire length. Therefore, a heliostat face may be considered curved by the selected orientation and position of adjacent planar panels.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

The invention claimed is:
1. A heliostat panel, comprising:
   a rigid foam creating a support structure having a first surface and a second surface opposite the first surface and a peripheral edge between the first surface and the second surface;
   a reflective surface rigidly adhered to the rigid foam; and
   a barrier layer circumscribing the peripheral edge and extending across the rigid foam, the first metal sheet, and the reflective surface.

2. The heliostat panel of claim 1, wherein the reflective surface comprises a second metal sheet.

3. The heliostat panel of claim 2, wherein the reflective surface is a surface of the metal sheet.

4. The heliostat panel of claim 2, wherein the reflective surface comprises a film on the metal sheet.

5. The heliostat panel of claim 4, wherein the film comprises a thin polymeric material coated on an outer surface of the metal sheet with a thin layer of reflective material comprising metal.

6. A heliostat comprising: a support structure comprising a primary support having a first direction and a plurality of secondary supports having a second direction different from the first direction, the primary support configured to slideably engage the panel of claim 1.

7. The heliostat of claim 6, wherein the plurality of second supports comprises a plurality of rails, adjacent rails configured to support the panel of claim 1 therebetween.

8. The heliostat of claim 7, wherein the plurality of secondary supports comprises a plurality of rails, adjacent rails configured to support the panel of claim 1 therebetween.

9. The heliostat of claim 6, wherein the support structure comprises removable struts such that the support structure may be collapsed and expanded.

10. The heliostat of claim 9, wherein the support structure comprises a cable.

11. A heliostat comprising, at least three panels including a first wing panel, a second wing panel, and a centerpiece panel, wherein each of the at least three panels comprise separate panels each having:
- a rigid foam creating a support structure having a first surface and a second surface opposite the first surface and a peripheral edge between the first surface and the second surface,
- a reflective surface rigidly adhered to the rigid foam, and
- a barrier layer circumscribing the peripheral edge and extending across the rigid foam, the first metal sheet, and the reflective surface.

12. The heliostat of claim 11, wherein the first wing panel is a mirror opposite of the second wing panel and is on an opposing side of the centerpiece panel from the second wing panel.

13. The heliostat of claim 12, wherein the centerpiece panel is shaped to impose a desired orientation of the first wing panel and the second wing panel relative to the centerpiece panel.

14. The heliostat of claim 13, wherein a width of the centerpiece panel is tapered such that when adjacent edges of the first wing panel and the second wing panel rest against edges of the centerpiece panel, a front face of the first wing panel and second wing panel is angled greater than 0 degrees relative to a front face of the centerpiece panel.

\* \* \* \* \*